(12) United States Patent
Byrne

(10) Patent No.: US 7,779,876 B2
(45) Date of Patent: Aug. 24, 2010

(54) REINFORCED BLADE FOR USE IN A VULCANIZATION MOLD TO FORM A SIPE IN A TIRE

(75) Inventor: Francis J. Byrne, Medina, OH (US)

(73) Assignee: Bridgestone Americas Tire Operations, LLC

( * ) Notice: Subject to any disclaimer, the term of this patent is extended or adjusted under 35 U.S.C. 154(b) by 284 days.

(21) Appl. No.: 11/253,225

(22) Filed: Oct. 19, 2005

(65) Prior Publication Data

US 2007/0084534 A1  Apr. 19, 2007

(51) Int. Cl.
 B29C 33/42 (2006.01)
 B60C 11/12 (2006.01)
(52) U.S. Cl. ............... 152/209.18; 152/DIG. 3; 425/28.1; 425/46
(58) Field of Classification Search ............ 152/209.18, 152/DIG. 3; 425/28.1, 35, 46
 See application file for complete search history.

(56) References Cited

U.S. PATENT DOCUMENTS

| | | | | |
|---|---|---|---|---|
| 2,612,928 A * | 10/1952 | Buddenhagen | ......... | 152/DIG. 3 |
| D169,914 S * | 6/1953 | Roberts | ................. | 152/DIG. 3 |
| D187,411 S | 3/1960 | Marick | | |
| 3,415,923 A | 12/1968 | Petersen | | |
| 4,055,209 A | 10/1977 | Senger | | |
| 4,765,384 A | 8/1988 | Rohde | | |
| 5,048,583 A * | 9/1991 | Goto et al. | ............. | 152/DIG. 3 |
| 5,085,259 A | 2/1992 | Goergen et al. | | |
| 5,176,765 A * | 1/1993 | Yamaguchi et al. | .... | 152/DIG. 3 |
| 5,211,781 A * | 5/1993 | Adam et al. | ........... | 152/DIG. 3 |
| 5,343,914 A | 9/1994 | Wako | | |
| 5,361,816 A | 11/1994 | Hitzky | | |
| D380,717 S | 7/1997 | Rohweder et al. | | |
| D381,302 S | 7/1997 | Rohweder et al. | | |
| D384,315 S | 9/1997 | Rohweder et al. | | |
| 5,769,977 A | 6/1998 | Masaoka | | |
| 5,824,169 A | 10/1998 | Landers et al. | | |
| 6,196,288 B1 * | 3/2001 | Radulescu et al. | ..... | 152/DIG. 3 |
| 6,341,633 B1 | 1/2002 | Adlon et al. | | |
| 6,408,911 B1 | 6/2002 | Tanabe et al. | | |
| 6,488,064 B1 | 12/2002 | Radulescu | | |
| 2002/0007889 A1 * | 1/2002 | Eromaki | ................ | 152/209.17 |

FOREIGN PATENT DOCUMENTS

DE    3118407    * 12/1982

(Continued)

OTHER PUBLICATIONS

International Search Report and Written Opinion of the International Searching Authority issued by the European Patent Office Jan. 31, 2007 (10 pages).

*Primary Examiner*—Steven D Maki
(74) *Attorney, Agent, or Firm*—Thomas R. Kingsbury

(57) ABSTRACT

A reinforced blade for use in a tire vulcanization mold is provided. The reinforced blade, having a thickness of less than 0.030 inches, is configured to form a sipe in a tread of a tire in the tire vulcanization mold. The reinforced blade includes a main segment and a support segment extending from one end portion of the main segment of the reinforced blade and configured to support the end portion of the main segment of the reinforced blade in the mold during vulcanization.

10 Claims, 9 Drawing Sheets

FOREIGN PATENT DOCUMENTS

| | | | |
|---|---|---|---|
| JP | 63-297107 | * | 12/1988 |
| JP | 04 353431 A | | 12/1992 |
| JP | 09 094828 A | | 4/1997 |
| JP | 10-114205 | * | 5/1998 |
| JP | 11-058386 | * | 3/1999 |
| JP | 2000 289413 A | | 10/2000 |
| JP | 2002-187413 | * | 7/2002 |
| JP | 2004-210043 | * | 7/2004 |

* cited by examiner

REINFORCED BLADE FOR USE IN A VULCANIZATION MOLD TO FORM A SIPE IN A TIRE

FIELD OF INVENTION

The present application is directed to a blade for use in a vulcanization mold, and more particularly, to a reinforced blade for use in a vulcanization mold to form a thin sipe in a tire.

BACKGROUND

Many motor vehicle tires have a circumferential tread provided with a plurality of circumferential grooves that define ribs therebetween. Typically, generally lateral slots can be provided in the ribs to form a plurality of shaped blocks. These shaped blocks can be distributed along the tread according to a specific pattern. Sipes, which are generally narrow slits cut into the tread, can be provided in the shaped blocks to improve wet, snow, and ice traction of the tire.

Generally, a siping element or blade is provided in a vulcanization mold to form a sipe in the tread of a tire. The blade can be provided in the vulcanization mold in the following ways: 1) both ends of the blade can be connected to or in contact with one or more ribs in the mold; 2) one end of the blade can be connected to or in contact with an adjacent rib in the mold; or 3) neither end of the blade is connected to or in contact with a rib in the mold. In the second and third scenarios, where one or both ends of the blade are not connected to or in contact with a rib in the mold, the end(s) of the blades are left unsupported. These unsupported end(s) of the blade are subject to damage (e.g., bending or warping) during the vulcanization process due to the intense pressure and heat created in the vulcanization mold.

To prevent the unsupported end(s) of the blade from bending or warping during the vulcanization process, the blade is designed to withstand the pressure and heat created in the vulcanization mold. Several important blade design factors include blade material and thickness. Generally, by increasing the material strength and thickness of the blade, the unsupported end is strengthened and its ability to withstand the vulcanization process increases. Other blade design factors include the length and height of the blade provided in the mold. Generally, by decreasing the length and height of the blade, the strength of the unsupported end increases. Another blade design consideration is the effect of heat on the blades during the casting of the vulcanization mold (e.g., an aluminum vulcanization mold). For example, when an aluminum mold is cast, the heat generated from the molten aluminum can cause the blades to be re-heated, thereby weakening the heat-treated blades.

Blades currently used in the tire industry are typically constructed of heat-treated steel (e.g., stainless or other alloy) having a thickness of at least 0.030 inches. The unsupported ends of these blades are typically capable of withstanding the heat and pressure generated during the vulcanization process. Blades also vary in length and height depending on the desired tread pattern.

SUMMARY

The present application is directed to a tire having a circumferential tread that includes at least one sipe provided therein. The at least one sipe has a main portion and a minor portion extending from at least one end portion of the main portion. The at least one sipe has a thickness of less than 0.030 inches.

The present application is also directed to a vulcanization mold for the production of a tire. The mold includes a mold housing having tread imparting structure configured to form a tread in a tire. The tread imparting structure has at least one reinforced blade configured to create at least one sipe in the tread of the tire. The reinforced blade includes a main segment and a support segment extending from one end portion of the main segment of the reinforced blade at an angle relative to an axis that extends from the one end portion of the main segment to the other end portion of the main segment of the reinforced blade. The reinforced blade has a thickness of less than 0.030 inches.

Additionally, the present application is directed to a reinforced blade for use in a vulcanization mold that is configured to form a sipe in a tread in a tire being molded. The reinforced blade includes a main segment and a support segment extending from at least one end portion of the main segment of the reinforced blade. The support segment is configured to strengthen the at least one end portion of the main segment of the reinforced blade in the mold during vulcanization. The reinforced blade has a thickness of less than 0.030 inches.

BRIEF DESCRIPTION OF THE DRAWINGS

In the accompanying drawings, embodiments of a reinforced blade, mold, and tire tread are illustrated that, together with the detailed description given below, describe example embodiments of the claimed invention. It will be appreciated that the illustrated boundaries of elements in the figures represent one example of the boundaries. One of ordinary skill in the art will appreciate that one element may be designed as multiple elements or that multiple elements may be designed as a single element. An element shown as an internal component of another element may be implemented as an external component and vice-versa.

Further, in the accompanying drawings and description that follow, like parts are indicated throughout the drawings and description with the same reference numerals, respectively. The figures are not drawn to scale and the proportions of certain parts have been exaggerated for convenience of illustration.

DETAILED DESCRIPTION

The following includes definitions of selected terms employed herein. The definitions include various examples and/or forms of components that fall within the scope of a term and that may be used for implementation. The examples are not intended to be limiting. Both singular and plural forms of terms may be within the definitions.

"Axial" and "axially" refer to a direction that is parallel to the axis of rotation of a tire.

"Circumferential" and "circumferentially" refer to lines or directions extending along the perimeter of the surface of the tread parallel to the equatorial plane and perpendicular to the axial direction of the tire.

"Groove" refers to an elongated void area in the tread of the tire that extends circumferentially in a straight, curved or zig-zag manner.

"Lateral" refers to a direction along the tread of the tire going from one sidewall of a tire to the other sidewall.

"Radial" and "radially" refer to a direction perpendicular to the axis of rotation of a tire.

"Sidewall" refers to that portion of the tire between the tread and the bead.

"Sipe" refers to a thin slit formed in the surface of the tread that may extend laterally, circumferentially, or at an acute angle relative to the circumferential direction of the tire. A sipe can have a depth that is up to 100% of the maximum depth of a groove or slot formed in the tire.

"Slot" refers to an elongated void area in the tread of the tire that extends laterally or at an acute angle relative to the circumferential direction of the tire. A slot can be straight, curved or zig-zagged.

"Tread" refers to that portion of the tire that comes into contact with the road under normal load.

Figure 1A:
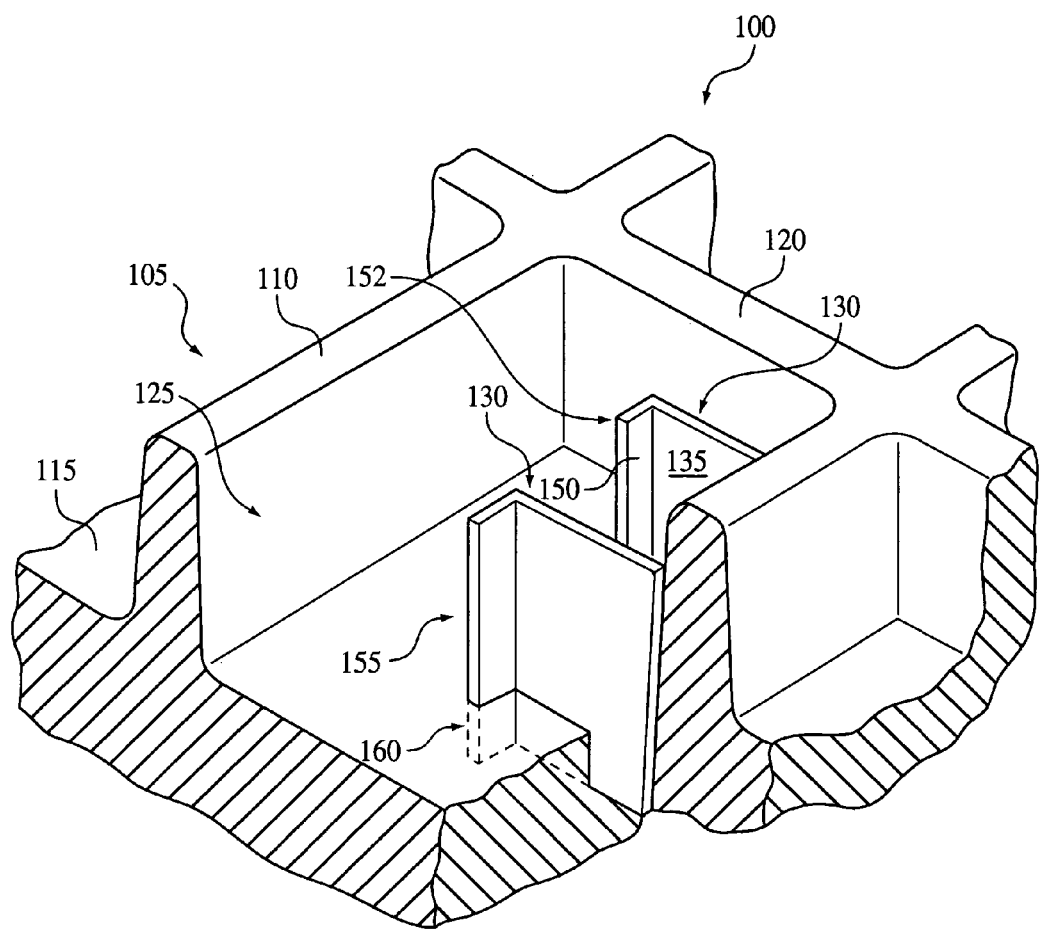
FIGS. 1A and 1B are fragmentary perspective and top views, respectively, of one embodiment of a tire vulcanization mold 100.
Figure 1B:
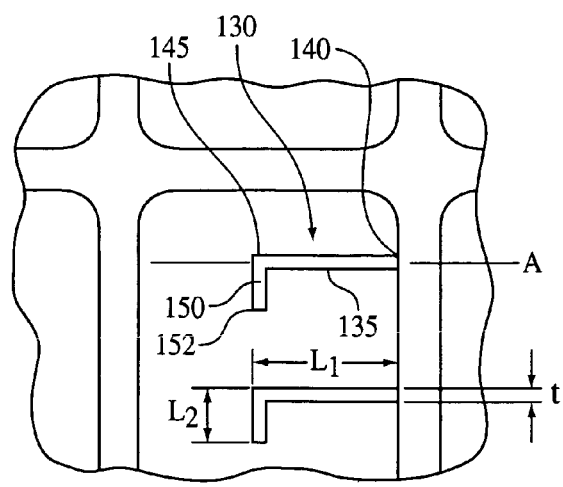

Illustrated in FIGS. 1A and 1B are fragmentary perspective and top views, respectively, of one embodiment of a vulcanization mold 100. As shown in FIG. 1A, the mold 100 includes a tread imparting structure 105 configured to form a tread to a tire (not shown) being molded. The tread imparting structure 105 includes one or more circumferential frame segments 110 that protrude outward from a base surface 115. The circumferential frame segments 110 can be arranged at certain intervals in the lateral direction of the tire. The tread imparting structure 105 also includes one or more lateral frame segments 120 that cross at right angles with the circumferential frame segments 110. The lateral frame segments 120 can be arranged at certain intervals in the circumferential direction of the tire. These circumferential frame segments 110 and lateral frame segments 120 form a plurality of frames defining recesses 125 therebetween.

The circumferential frame segments 110 and lateral frame segments 120 are configured to form circumferential grooves (not shown) and lateral slots (not shown), respectively, in the tread of the tire being molded. These circumferential grooves and lateral slots define shaped blocks (not shown) in the tread of the tire.

As shown in FIG. 1B, in one embodiment, the tread imparting structure 105 includes one or more siping elements or blades 130 disposed in the recess 125. The blades 130 are configured to form sipes in the outer surface of the shaped blocks during molding of the tire. The blade 130 includes a main segment 135 having a length $L_1$ and an axis A defined between a first end 140 in contact with or connected to the circumferential frame segment 110 and a second end 145. Although FIGS. 1A and 1B illustrate the mold 100 having two blades 130 provided therein, it will be appreciated that a single blade or more than two blades may be provided depending on the desired tread design.

As shown in FIG. 1B, in one embodiment, the blade 130 has a uniform thickness t that is less than 0.030 inches. In another embodiment, the blade 130 has a uniform thickness t that is less than 0.025 inches. In yet another embodiment, the blade 130 has a uniform thickness t that is less than 0.020 inches. Preferably, the thickness t of the blade 130 is about 0.018 inches.

The blade 130 can, for example, be constructed of a plate-like or sheet-like material. Examples of suitable materials include sheet metal made of steel, stainless steel, aluminum, or various alloys. It will be appreciated that the blade 130 can have a non-uniform thickness. For example, the blade 130 can have alternating wide and narrow portions (not shown) along its length.

To permit the blade 130 having a thickness of less than 0.030 inches to withstand the vulcanization process, one or both ends of the blade 130 may be supported. For example, since the second end 145 of the main segment 135 of the blade 130 is unsupported as shown in FIGS. 1A and 1B, a support segment 150 can be provided. The support segment 150 extends from the second end 145 of the main segment 135 of the blade 130 and terminates at an end 152. The support segment 150 is configured to support or reinforce the second end 145 of the main segment 135 of the blade 130 to prevent bending or warping thereof during the vulcanization process. Hence, the blade 130 configured with the support segment 150 may hereinafter be referred to as the "reinforced blade 130."

As shown in FIG. 1B, in one embodiment, the support segment 150, having a length $L_2$, extends from the second end 145 of the main segment 135 of the reinforced blade 130 at a substantially 90° angle relative to the axis A of the main segment 135 of the reinforced blade 130. The relative orientation of the support segment 150 to the main segment 135 renders the reinforced blade 130 substantially L-shaped as shown in FIGS. 1A and 1B. It will be appreciated that the support segment 150 may extend from the second end 145 of the main segment 135 of the reinforced blade 130 at any angle relative to the axis A so long as the second end 145 of the main segment 135 of the reinforced blade 130 is sufficiently supported to withstand the vulcanization process.

In one embodiment, the axis A of the main segment 135 of the reinforced blade 130 is substantially perpendicular to the circumferential frame segment 110 as shown in FIGS. 1A and 1B. However, it will be appreciated that the main segment 135 of one or more of the reinforced blades 130 can be oriented at an acute angle with respect to the circumferential frame segment 110.

Figure 2A:
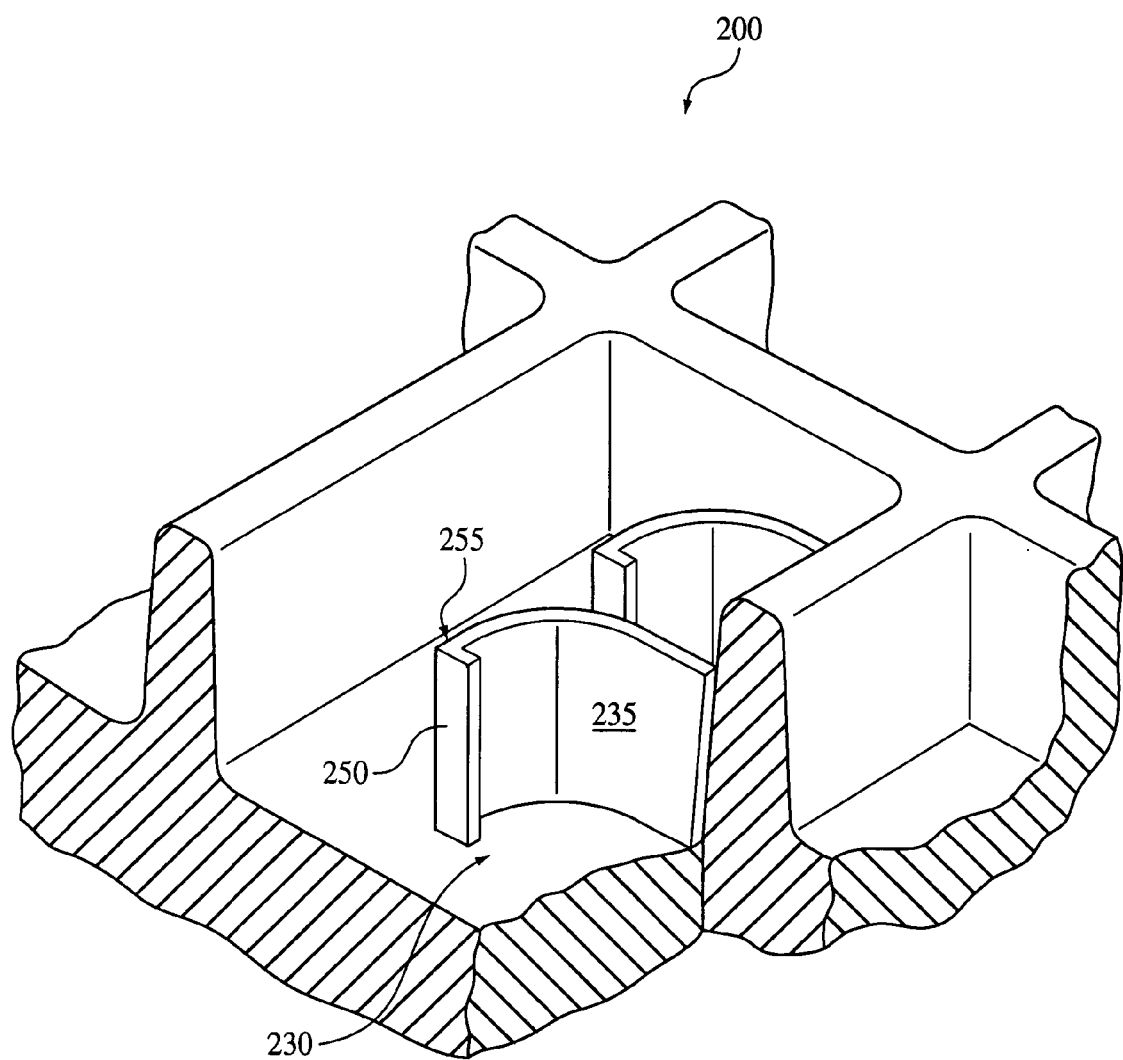
FIGS. 2A-2C are fragmentary perspective views of tire vulcanization molds that each include reinforced blades having main segments of various shapes.
Figure 2B:
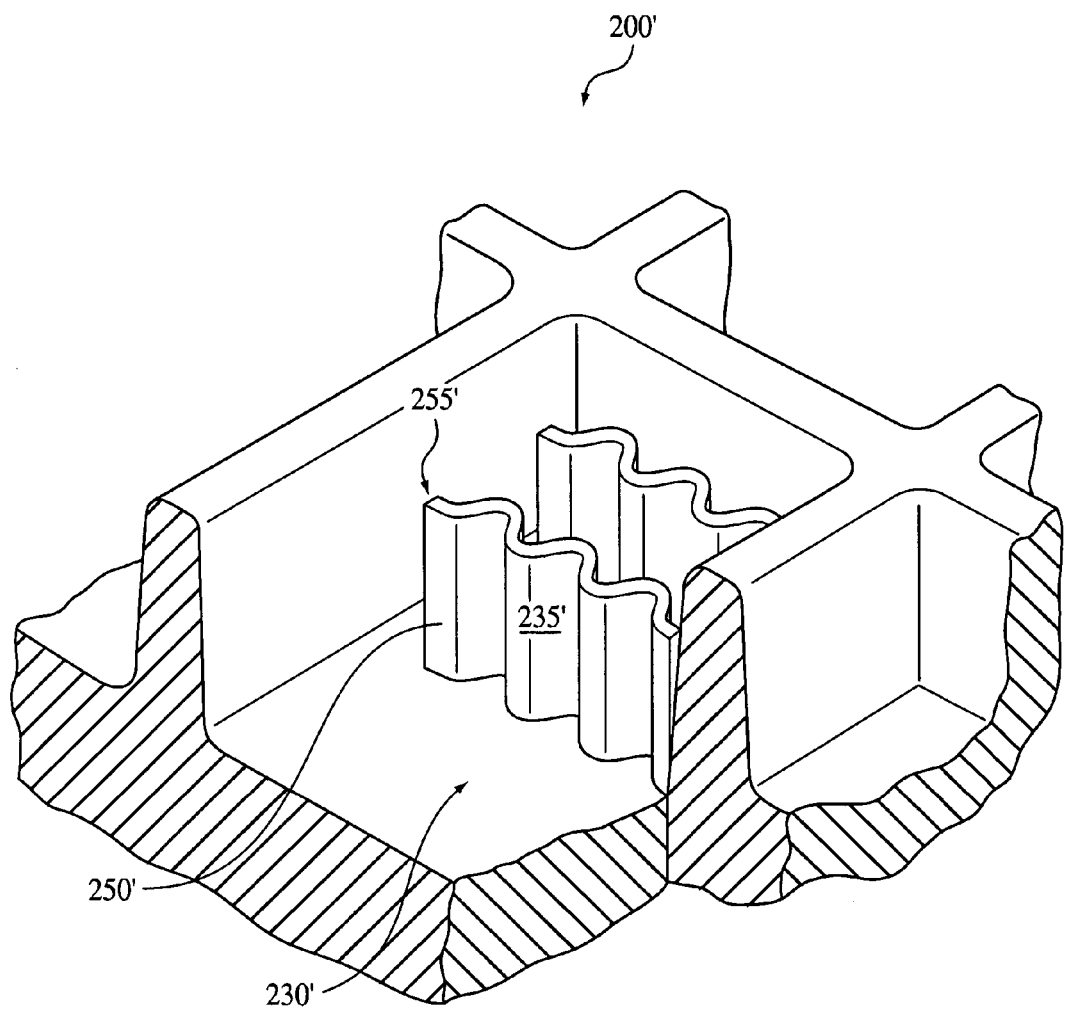
Figure 2C:
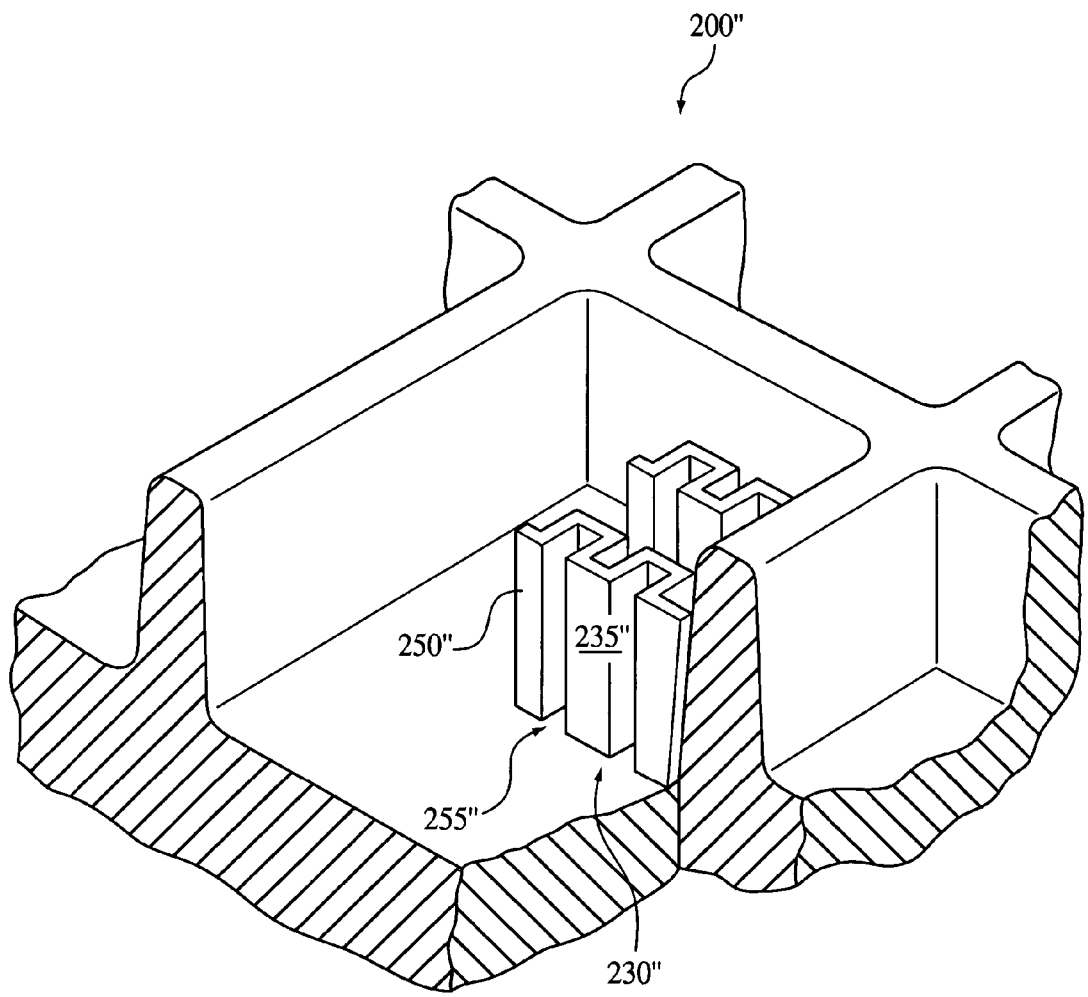

Although the main segment 135 of the reinforced blade 130 is illustrated as being substantially planar, it will be appreciated that the main segment 135 may be non-planar. For example, FIGS. 2A-2C illustrate perspective views of molds that include reinforced blades having main segments of various shapes. As shown in FIG. 2A, a mold 200 includes a reinforced blade 230 having a curved main segment 235. A support segment 250 extends from an unsupported end 255 of the curved main segment 235 to reinforce the unsupported end 255 of the blade 230. The curved main segment 235 in FIG. 2A may be alternatively referred to as an open contour curved main portion with a single curve that includes a first end and a second end. In FIG. 2A, the open contour curved main portion with a single curve is an arc that is equal to or less than 90 degrees, i.e., an arc that is not greater than 90 degrees. As shown in FIG. 2B, a mold 200' includes a reinforced blade 230' having a wavy main segment 235'. A support segment 250' extends from an unsupported end 255' of the wavy main segment 235' to reinforce the unsupported end 255' of the blade 230'. As shown in FIG. 2C, a mold 200" includes a reinforced blade 230" having a curved main segment 235". A support segment 250" extends from an unsupported end 255" of the curved main segment 235" to reinforce the unsupported end 255" of the blade 230".

In one embodiment, the length $L_2$ of the support segment 150 of the reinforced blade 130 is less than the length $L_1$ of the main segment 135 of the reinforced blade 130 as shown in FIG. 1B. It will be appreciated that the length $L_2$ of the support segment of the reinforced blade 130 should be sufficiently short enough to prevent its unsupported end (i.e., end 152) from being damaged during the vulcanization process. Furthermore, it will be appreciated that the support segment 150 of the reinforced blade 130 can take the form of other shapes (e.g., curved, wavy, or stepped) instead of substantially straight as shown in FIGS. 1A and 1B.

Figure 3:
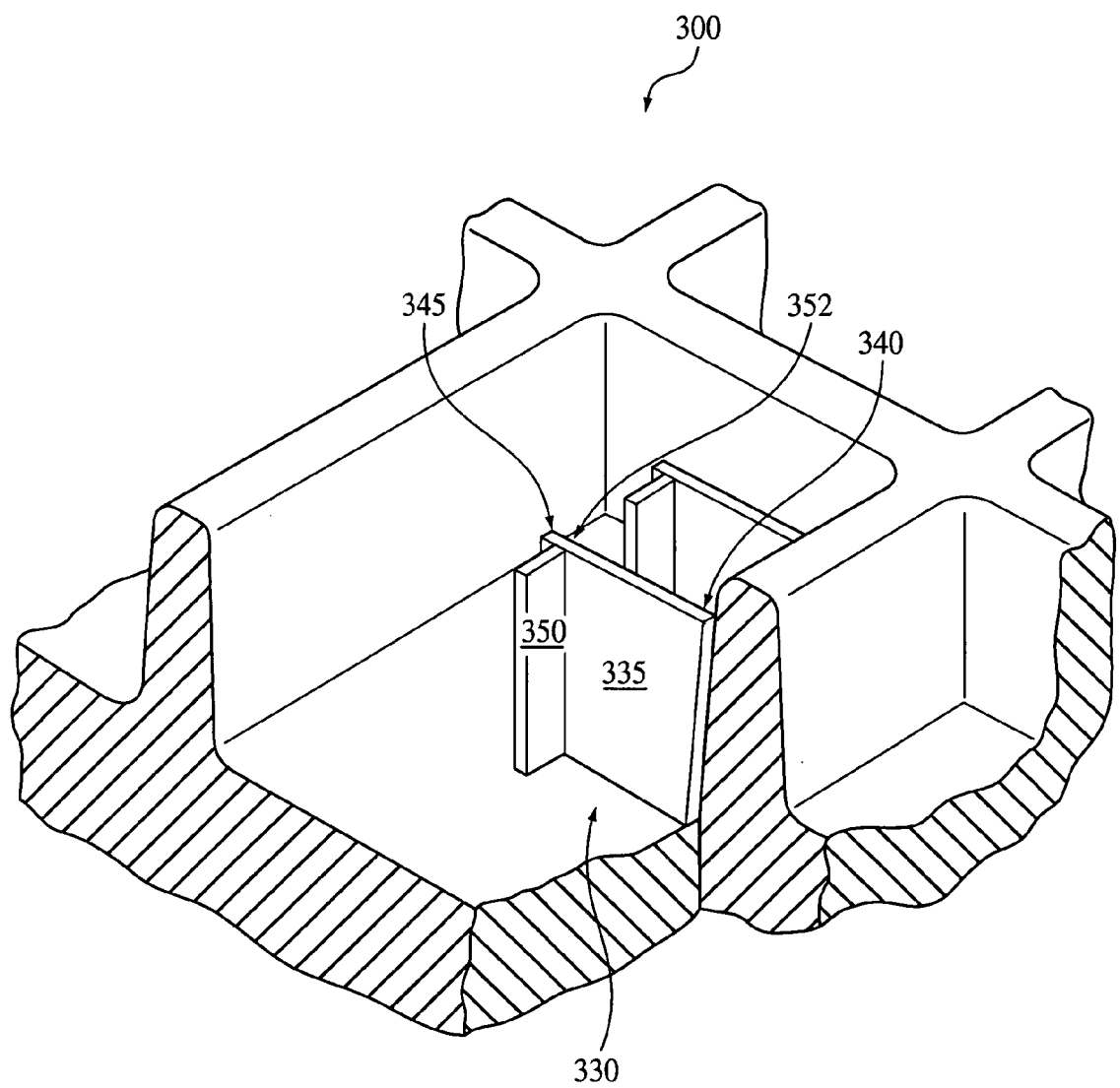
FIG. 3 is a fragmentary perspective view of another embodiment of a tire vulcanization mold 300.

FIG. 3 illustrates a perspective view of another embodiment of a vulcanization mold 300, which is similar to the mold 100 described above and illustrated in FIGS. 1A and 1B. In this embodiment, the mold 300 includes a reinforced blade 330 having a main segment 335, which includes a first end 340 and a second end 345, and a support segment 350 that extends from an end portion 352 of the main segment 335 of the reinforced blade 330, instead of the second end 345 of the main segment 335 of the reinforced blade 330. The end portion 352 includes a portion of the main segment 335 of the reinforced blade 330 that extends from the absolute end (i.e., the second end 345) of the main segment 335 to a location spaced from, but near, the second end 345 of the main segment 335 of the reinforced blade 330. Accordingly, as used herein, the term "end portion" includes a portion of the main segment of the reinforced blade that extends from an absolute end of the main segment to a location spaced from, but near, the absolute end of the main segment. This location can be anywhere between the absolute end of the main segment and the midpoint of the main segment of the reinforced blade so long as the absolute end of the main segment of the reinforced blade is sufficiently supported to withstand the vulcanization process. It will be appreciated that any of the reinforced blades described herein can include at least one support segment that extends from an end portion of the main segment of the reinforced blade.

Figure 4:
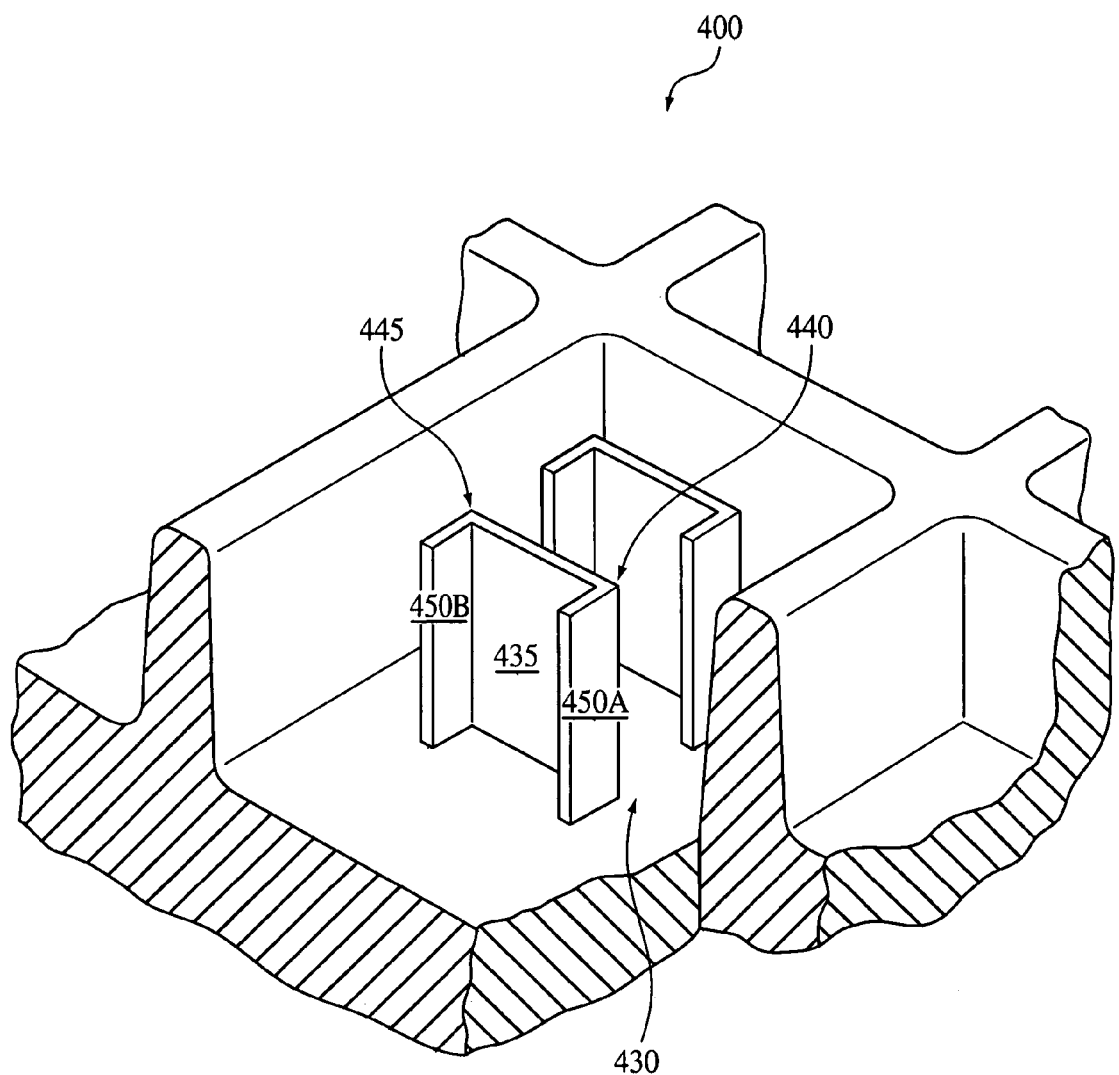
FIG. 4 is a fragmentary perspective view of another embodiment of a tire vulcanization mold 400.

FIG. 4 illustrates a perspective view of another embodiment of a vulcanization mold 400, which is similar to the mold 100 described above and illustrated in FIGS. 1A and 1B. In this embodiment, the mold 400 includes a reinforced blade 430 having a main segment 435, which includes a first end 440 and a second end 445. To reinforce the first and second ends 440, 445 of the main segment 435 of the blade 430, the blade 430 includes two support segments 450a,b that extend from the first and second ends 440, 445, respectively, of the main segment 435 of the reinforced blade 430.

The reinforced blades discussed above can be provided in a mold in a variety of ways. For example, with reference back to FIGS. 1A and 1B, the reinforced blade 130 can be formed as a separate component that can be inserted into the vulcanization mold 100. In this embodiment, the reinforced blade 130 includes a sipe forming portion 155 that extends above the base surface 115 of the tread imparting structure 105 and an embedded portion 160 that extends below the base surface 115 of the tread imparting structure 105. The embedded portion 160 may include holes (not shown) to permit the reinforced blade 130 to be anchored in the mold 100 via pins. Other means to secure the reinforced blade 130 to the mold 100 are possible and known in the art. Alternatively, the reinforced blade 130 can be an integral part of the mold (e.g., formed directly in the vulcanization mold during casting of the mold).

If the reinforced blade 130 is not provided as an integral part of the vulcanized mold and is provided as a separate component, the reinforced blade 130 can be fabricated by various manufacturing processes. For example, the reinforced blade 130 can be formed by bending a piece of sheet metal to the desired shape (e.g., L-shaped). Another exemplary manufacturing process is to cast the reinforced blade 130 to the desired shape. Alternatively, a two-piece design can be provided where the support segment 150 can be welded, bolted, or pinned to the main segment 135 of the reinforced blade 130.

Figure 5:
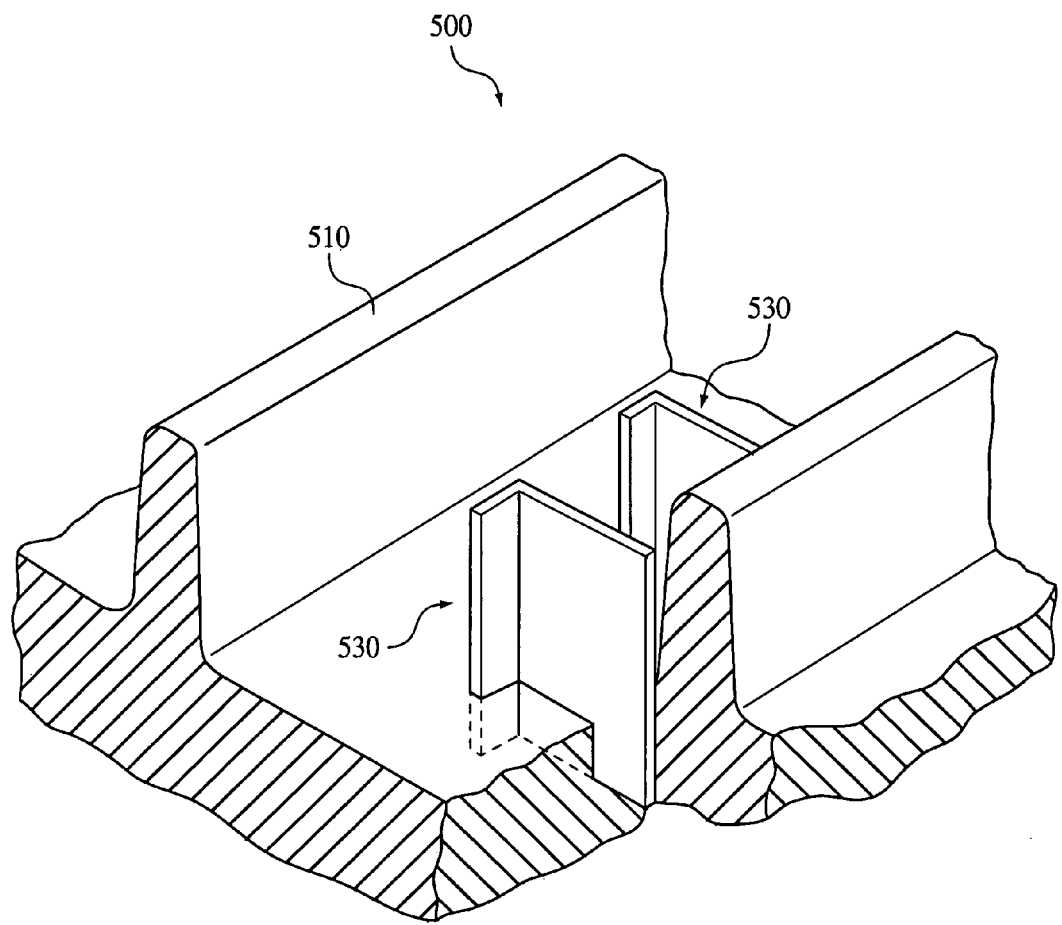
FIG. 5 is a fragmentary perspective view of another embodiment of a tire vulcanization mold 500.

Illustrated in FIG. 5 is a fragmentary perspective view of another embodiment of a tire vulcanization mold 500. The mold 500 is substantially similar to the mold 100 described above and illustrated in FIG. 1, except that the mold 500 lacks the lateral frame segments that cross at right angles with circumferential frame segments 510. As shown in FIG. 5, the mold 500 includes reinforced blades 530 substantially similar to the reinforced blades 130 described above and illustrated in FIG. 1.

Figure 6:
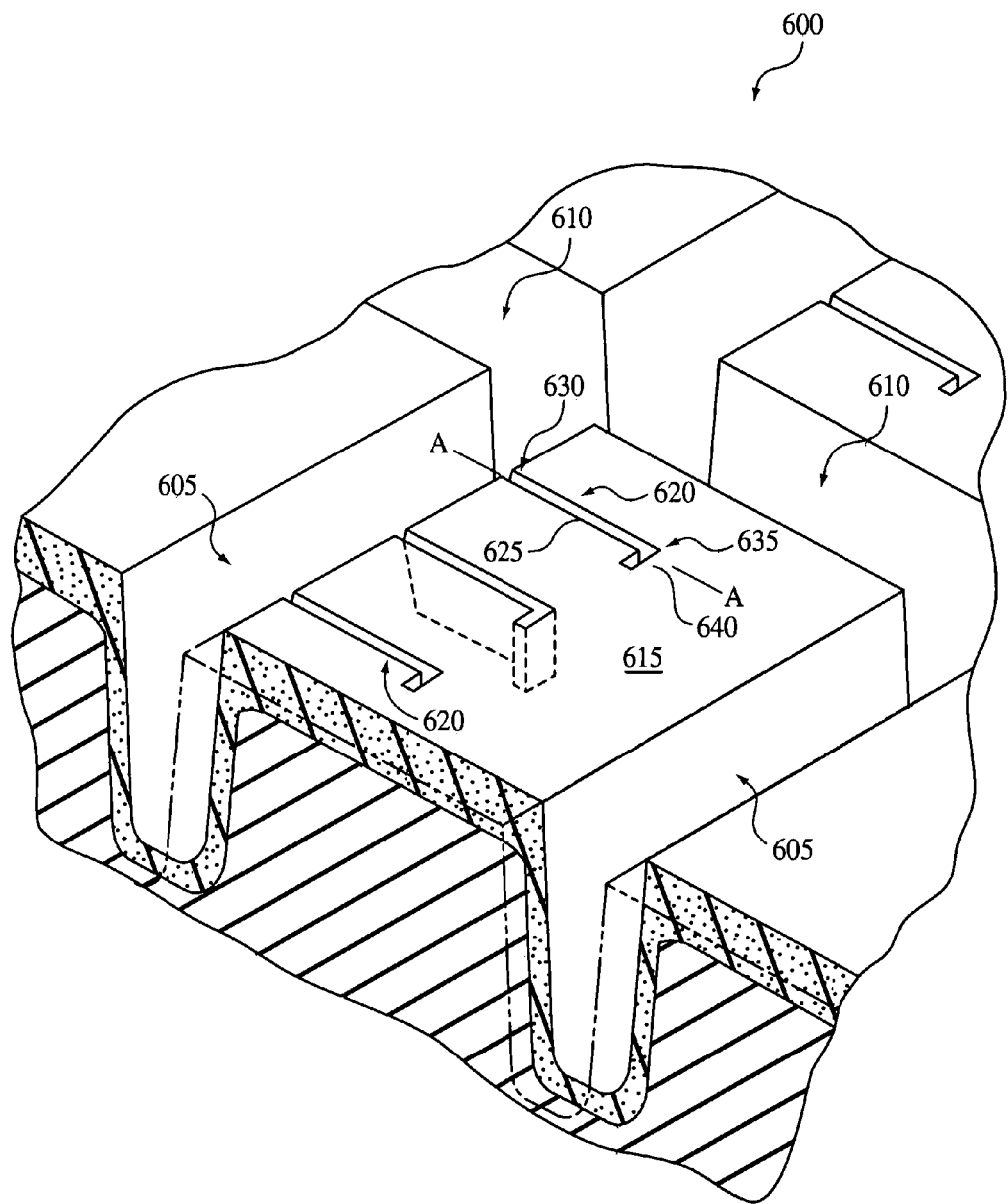
FIG. 6 is a fragmentary perspective view of a portion of a tread 600 of a tire formed in the mold 100 illustrated in FIG. 1.

Illustrated in FIG. 6 is a fragmentary perspective view of a portion of a tread 600 of a tire produced during the vulcanization process in the mold 100 described above and depicted in FIGS. 1A and 1B. To produce the tire in the mold 100, a tire (not shown) is placed in the mold 100 and then a vulcanization medium of high temperature and high pressure is charged into an inside of a bladder (not shown) to force the tire into the tread imparting structure 105. In this manner, the circumferential frame segments 110 and lateral frame segments 115 form one or more circumferential grooves 605 and one or more lateral grooves 610 in the outer surface of the tread 600, which define one or more shaped blocks 615. In this manner, reinforced blades 130 are forced into the tire, thereby forming sipes 620 in the outer surface of the shaped blocks 615 of the tread 600.

As shown in FIG. 6, each sipe 620 includes a main portion 625 having a first end 630 in communication with one of the circumferential grooves 605. Extending from a second end 635 of the main portion 625 of the sipe 620 is a minor portion 640. The minor portion 640 extends from the main portion 625 of the sipe 620 at a substantially 90° angle relative to the axis A of the main portion 625 of the sipe 620 as shown in FIG. 6. It will be appreciated that since the sipes 620 are formed in the shaped blocks 615 by the reinforced blades in the mold, the shape and dimensions of the sipes 620 in the tire tread will be the inverse of the shape and dimensions of the reinforced blades in the mold. Therefore, any of the features described above regarding the reinforced blade (e.g., the orientation of the main segment 135 to the circumferential frame segment 110, the orientation of the support segment 150 to the main segment 135, the shape of the main and support segments 135, 150, and the thickness of the reinforced blade 130) apply to the sipes 620 discussed herein. It will also be appreciated that the to the extent that the reinforced blade in the mold includes a support segment that extends from an end portion of the main segment as described above, the resulting sipe formed in the tire tread will include a minor portion that extends from an end portion of the main portion of the sipe.

Figure 7:
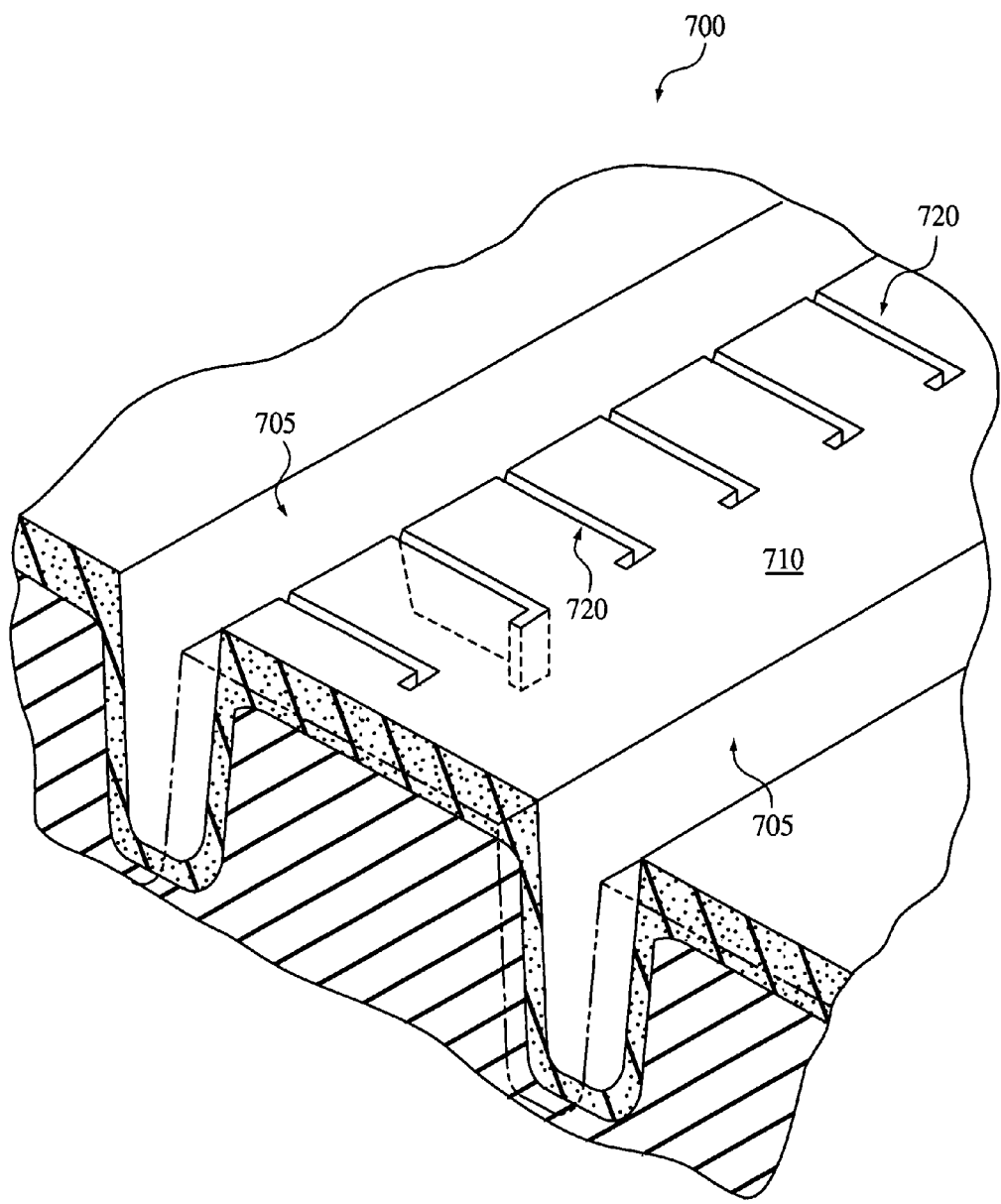
FIG. 7 is a fragmentary perspective view of a portion of a tread 700 of a tire formed in the mold 500 illustrated in FIG. 5.

Illustrated in FIG. 7 is a fragmentary perspective view of a portion of a tread 700 of a tire produced in the vulcanization mold 500. The tread 700 is substantially similar to the tread 600 described above and illustrated in FIG. 6, except that the tread 700 lacks the lateral grooves that cross at right angles with one or more circumferential grooves 705. Thus, the tread 700 includes the one or more circumferential grooves 705 bound by one or more circumferential ribs 710. As shown in FIG. 7, the tread 700 includes sipes 720 provided in the rib 710 that are substantially similar to sipes 620 described above and illustrated in FIG. 6.

In another embodiment, a tire includes a circumferential tread including at least one circumferential groove that defines a side of at least one tread element and at least one sipe is provided in the at least one tread element. The at least one sipe includes an open contour curved main portion with a single curve consisting of an arc that is substantially equal to 90 degrees. The at least one sipe further includes a first end and a second end, a first substantially straight minor portion, and a second substantially straight minor portion. The first end of the single curve is directly connected only to the first substantially straight minor portion, and the second end of the single curve is directly connected only to the second substantially straight minor portion. The first substantially straight minor portion is in communication with the at least one circumferential groove, and the second substantially straight minor portion is terminated in the tread element such that the second substantially straight minor portion is not in communication with a groove and not in communication with another sipe. The at least one sipe has a thickness of less than 0.030 inches and each of the first and second substantially straight minor portions has a length less than the length of the curved main portion.

As discussed above, the sipes 620, 720 have a thickness of less than 0.030 inches and, preferably, a thickness of about 0.018 inches. By providing sipes 620, 720 that are thinner than ones currently used in the tire industry, more sipes can be provided in a single shaped block or around the circumference of one or more of the ribs resulting in a larger pitch per shaped block or rib. Generally, the larger the pitch, the greater the circumferential edge density of the tire. Increasing the circumferential edge density of the tire can reduce the stiffness in the block or rib, which can result in improved wet, snow, and ice traction of the tire.

To the extent that the term "includes" or "including" is used in the specification or the claims, it is intended to be inclusive in a manner similar to the term "comprising" as that term is interpreted when employed as a transitional word in a claim. Furthermore, to the extent that the term "or" is employed (e.g., A or B) it is intended to mean "A or B or both." When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995). Also, to the extent that the terms "in" or "into" are used in the specification or the claims, it is intended to additionally mean "on" or "onto." Furthermore, to the extent the term "connect" is used in the specification or claims, it is intended to mean not only "directly connected to," but also "indirectly connected to" such as connected through another component or components.

While the present application illustrates various embodiments, and while these embodiments have been described in some detail, it is not the intention of the applicant to restrict or in any way limit the scope of the appended claims to such detail. Additional advantages and modifications will readily appear to those skilled in the art. Therefore, the invention, in its broader aspects, is not limited to the specific details, the representative apparatus, and illustrative examples shown and described. Accordingly, departures may be made from such details without departing from the spirit or scope of the applicant's general inventive concept.

What is claimed is:

1. A tire comprising:
   a circumferential tread including at least one circumferential groove defining a side of at least one tread element and at least one sipe provided in the at least one tread element, the at least one sipe having an open contour curved main portion with a single curve consisting of an arc that is substantially equal to 90 degrees and that includes a first end and a second end, a first substantially straight minor portion, and a second substantially straight minor portion, wherein the first end of the single curve is directly connected only to the first substantially straight minor portion and the second end of the single curve is directly connected only to the second substantially straight minor portion, where the first substantially straight minor portion is in communication with the at least one circumferential groove and the second substantially straight minor portion is terminated in the tread element such that the second substantially straight minor portion is not in communication with a groove and not in communication with another sipe, the at least one sipe having a thickness of less than 0.030 inches and wherein each of the first and second substantially straight minor portions has a length less than the length of the curved main portion.

2. The tire of claim 1 wherein the second minor portion of the at least one sipe is substantially perpendicular to the main portion of the at least one sipe.

3. The tire of claim 1 wherein the second minor portion of the at least one sipe is oriented at an acute angle relative to the main portion of the at least one sipe.

4. The tire of claim 1 wherein the at least one sipe has a thickness of about 0.018 inches.

5. A tire tread comprising:
   at least one shaped block and at least one circumferential groove defining a side of the at least one shaped block and at least one sipe provided in the at least one shaped block, the at least one sipe having an open contour single curved main portion that is an arc that is substantially equal to 90 degrees and that includes a first end and a second end, a first end of a first substantially straight minor portion directly connected only to the first end of the main portion of the sipe, and a second substantially straight minor portion directly connected only to the second end of the main portion of the sipe, where a second end of the first substantially straight minor portion is in communication with the at least one circumferential groove and the second substantially straight minor portion is terminated in the shaped block such that the second substantially straight minor portion is not in communication with a groove and not in communication with another sipe and is directly connected only to the second end of the main portion to form the open contour, the sipe having a thickness of less than 0.030 inches and wherein each of the first and second substantially straight minor portions has a length less than the length of the curved main portion.

6. A vulcanization mold for the production of a tire, the mold comprising:
   a mold housing having tread imparting structure configured to form a circumferential tread including at least one circumferential groove in a green tire, wherein the at least one circumferential groove defines a side of at least one tread element;
   the tread imparting structure having at least one frame segment configured to create the at least one circumferential groove and at least one reinforced blade configured to create a sipe having an open contour curved main portion, a first substantially straight minor portion and a second substantially straight minor portion in the at least one tread element in the tread of the green tire, the reinforced blade having an open contour curved main segment with a single curve consisting of an arc that is substantially equal to 90 degrees and that includes a first end and a second end, a first substantially straight minor segment, and a second substantially straight minor segment, wherein the first end of the single curve is directly connected only to the first substantially straight minor segment, the first substantially straight minor segment being connected to the at least one frame segment and wherein the second end of the single curve is connected only to the second substantially straight minor segment having an unsupported end so that the second substantially straight minor portion of the sipe created by the reinforced blade is terminated in the tread element such that the second substantially straight minor portion is not in communication with a groove and not in communication with another sipe, the reinforced blade having a thickness of less than 0.030 inches, and wherein each of the first and second substantially straight minor segments has a length less than a length of the curved main segment.

7. The mold of claim 6 wherein the second segment of the at least one reinforced blade is substantially perpendicular to the main segment of the at least one reinforced blade.

8. The mold of claim 6 wherein the second segment of the at least one reinforced blade is oriented at an acute angle relative to the main segment of the at least one reinforced blade.

9. The mold of claim 6 wherein the at least one reinforced blade is configured to be removed from the mold.

10. The mold of claim 6 wherein the at least one reinforced blade has a thickness of about 0.018 inches.

* * * * *